INVENTORS
PAUL EUGENE CLAY, JR.
BY ROBERT FREDERIC TUCKER

Eli Weiss
ATTORNEY

May 6, 1969     P. E. CLAY, JR., ET AL     3,442,324
HEAT RECOVERY DEVICE FOR TURBINE GASES
Filed March 6, 1967     Sheet 2 of 5

INVENTORS
PAUL EUGENE CLAY, JR.
BY ROBERT FREDERIC TUCKER

ATTORNEY

May 6, 1969  P. E. CLAY, JR., ET AL  3,442,324
HEAT RECOVERY DEVICE FOR TURBINE GASES
Filed March 6, 1967  Sheet 3 of 5

INVENTORS
PAUL EUGENE CLAY, JR.
BY ROBERT FREDERIC TUCKER

ATTORNEY

INVENTORS
PAUL EUGENE CLAY, JR.
BY ROBERT FREDERIC TUCKER

ATTORNEY

United States Patent Office 3,442,324
Patented May 6, 1969

3,442,324
HEAT RECOVERY DEVICE FOR
TURBINE GASES
Paul Eugene Clay, Jr., and Robert Frederic Tucker,
Shreveport, La., assignors to American Machine
& Foundry Company, a corporation of New Jersey
Filed Mar. 6, 1967, Ser. No. 620,716
Int. Cl. F28f 27/02, 13/06
U.S. Cl. 165—38                                     9 Claims

ABSTRACT OF THE DISCLOSURE

A heat exchanger wherein a supply header, a discharge header and two fluid conducting members are connected to form concentric ducts. Thus, water flowing from the supply header to the discharge header surrounds completely the innermost duct. Heat exchanger tubes located within the innermost duct interconnect the supply header to the discharge header.

This invention relates generally to boilers and in particular to a heat exchanger for use in a boiler using a gas turbine as a heat generator.

It is an object of this invention to provide a heat exchange assemblage for a boiler which is compact in size.

It is another object of this invention to provide a heat exhange assemblage for a boiler which is approximately equal in weight to the weight of the heat generator.

It is still another object of this invention to provide a heat exchange assemblage for a broiler which can assume steady state operating conditions rapidly.

It is also an object of this invention to provide a heat exchange assemblage for a broiler which can be used successfully with a liquid or gaseous medium.

It is an additional object of this invention to provide a heat exchange assemblage for a broiler which is reliable in operation and economical to build.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawings.

Figure 1:
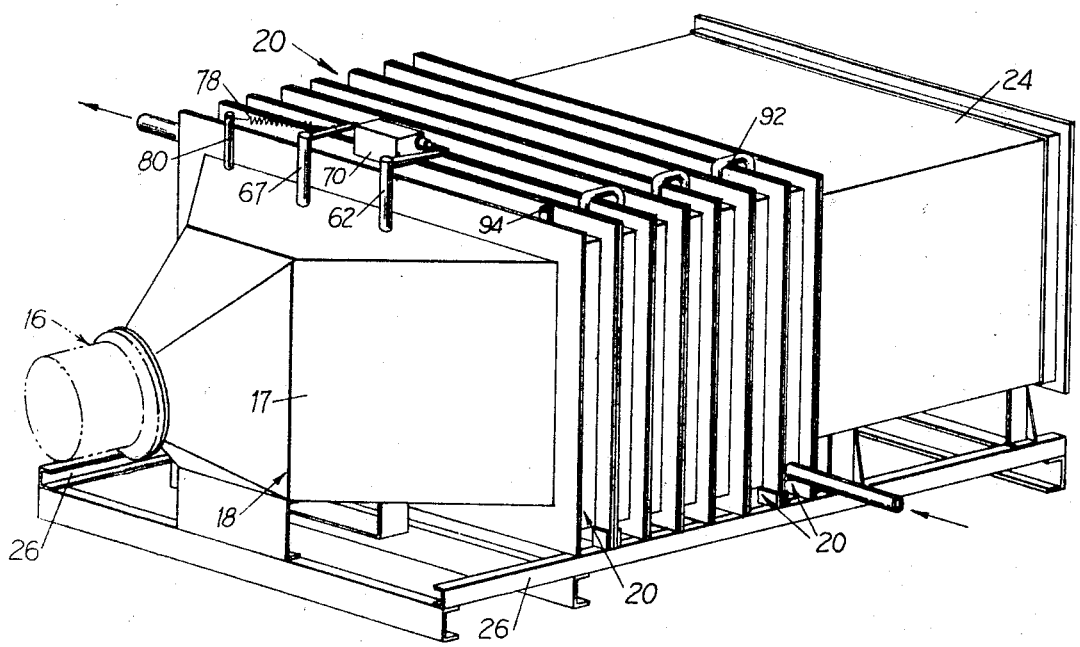
FIG. 1 is an isometric view of a boiler embodying the structure of this invention.

Referring to FIG. 1, a source of heat such as a turbine engine 16 is coupled to feed hot exhaust gasses through a manifold 18 having a diameter to an assemblage of one or more heat transfer units 20. A silencer 24 can be coupled to the downstream end of the assemblage of heat transfer units. The complete assemblage of turbine engine, diverter, heat transfer unit and silencer is mounted on and secured to frame members 26 by means of bolts, rivets, or the like to form a complete self-contained unit.

Figure 2:
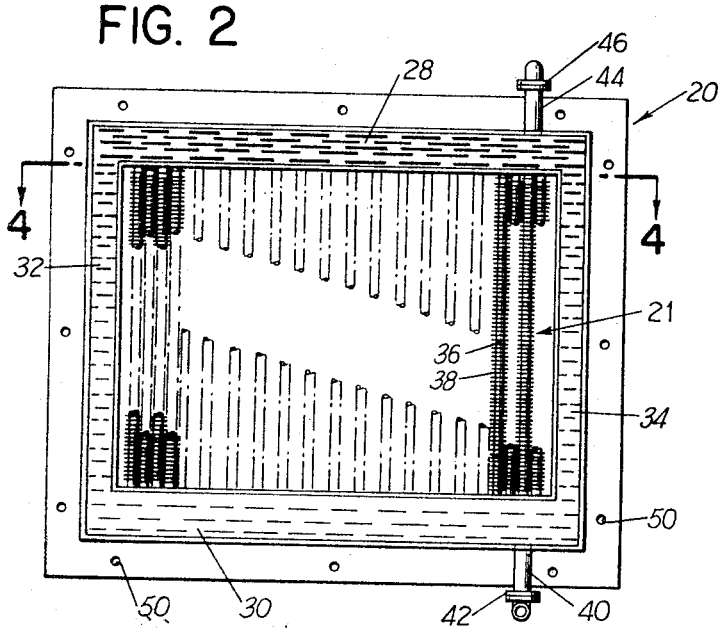
FIG. 2 is a sectional view of the structure of the invention.
Figure 4:
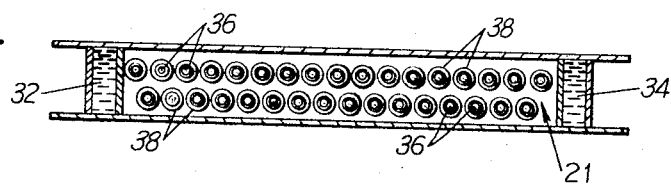
FIG. 4 is a view along the line 4—4 of FIG. 2.

The heat transfer unit 20, shown in more detail in FIG. 2, employs a water wall type of construction arranged to define a section of a primary duct 21 through which the hot gas flows. The primary duct is defined by upper fluid passageway 28 which can be considered to be a header, a lower fluid passageway 30 which can be considered to be another header, and two end fluid passageway 32, 34. The primary duct 21 defined by the four communicating passageways encloses a plurality of heat exchange tubes 36 which support a large number of closely spaced fins 38. The tubes 36 and the fins thereon can be of any desired heat conducting material. Iron was found to work in an acceptable manner. The tubes 36 provide passageways for the flow of a fluid medium being warmed between the upper passageway or header 28 and the lower passageway or header 30 in heat exchanging relationship with a stream of hot gas passing over their outer surfaces. The tubes in the primary duct 21 can be arranged in any particular desired pattern and in any desired number of rows. FIG. 4 illustrates one possible arrangement wherein the unit has a double row of tubes positioned on an equilateral triangular pitch.

The heat exchange tubes 36 are secured in water tight arrangement to the headers 28, 30 by brazing, welding or the like, a small clearance being maintained between the Ins 38 and the walls of the headers 28 and 30.

A first fluid conducting means such as a pipe 40 having a flange 42 attached thereto provides a fluid passageway to the interior of passageway or header 30; and a second fluid conducting means such as a pipe 44 having a flange 46 attached thereto provides a fluid passageway to the interior of passageway or header 28. The pipes 40, 44 are threaded, welded, brazed or the like to the wall of their respective passageway to form a tight leakproof connection. The side walls of the heat transfer unit project beyond the outermost portions of the upper, lower and end passageways to form two flanges, one on each side of the unit, each flange having a plurality of openings 50. The flanges serve to facilitate the assemblage of the units together.

Figure 5:
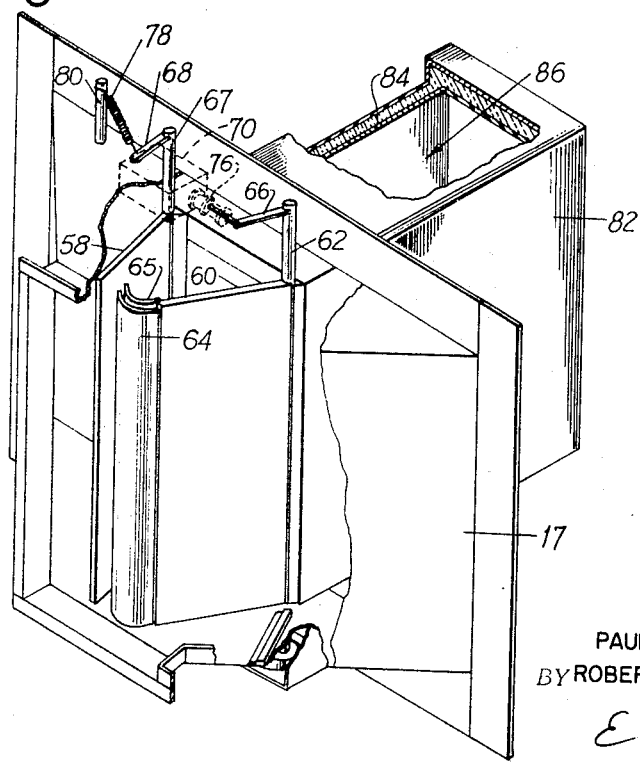
FIG. 5 is an isometric of a diverter valve and an associated by-pass duct.

In some installations, it is desirable to throttle the output of the boiler by dumping some or all of the heated fluid. This is accomplished by means of a diverter valve which can be positioned selectively to urge the hot gas through a secondary duct to by-pass the plurality of heat exchange tubes. FIG. 5 illustrates, in perspective, the structure of a diverter valve and internal bypass or secondary duct.

Referring to FIG. 5, the flow of hot gas through the secondary duct is controlled selectively by a diverter valve employing two vertically mounted damper blades 58, 60. Looking at blade 60, it is secured rigidly to a shaft 62 which is rotatably supported by the downstream diverging section 17 of the manifold 18. The blade 60 is internally insulated to prevent excessive heat linkage into the heat transfer unit when operating on full bypass. To further reduce the possibility of heat leakage, the blades seat on gasketed seals at either extreme of travel. A frontal plate 64 shaped to reduce turbulence is backed by a second plate 65 spaced from said plate 64 to reduce the transfer of heat. Plate 65 also serves as a stop for blade 60. The blade 58 is constructed and supported in the same manner as blade 60. Shaft 62 of blade 60 supports a lever arm 66, and shaft 67 of blade 58 supports lever arm 68. Lever arm 66 is pivotly coupled to and actuated by a solenoid assemblage 76 driven by a bypass actuator 70. A spring 78 anchored at one end to a pin 80 fixed to the manifold 18 is connected to lever arm 68 to urge blade 58 to an open (permit bypass) position. By providing an unbalancing force by means of the spring 78 to the blade 58, the bypass actuator 70 will activate the blades 60, 58 sequentially rather than simultaneously. In this manner a split range type of operation is obtained which refines the temperature control capability of the valve. Naturally, the same sequential operation of the damper blades can also be obtained by using two solenoids and two bypass actuators, each coupled to one of the lever arms, one of the bypass actuators being designed to operate slightly prior to the other. The bypass actuator can be a temperature or pressure sensitive device positioned to sense the fluid being heated in the heat transfer units. During operation, a pressure or temperature sensing means sends an electric signal to the actuator to either open or close the blades. When pressure is being measured, a build-up of steam pressure within the unit 20 beyond a preselected valve is sensed by the controller which urges the solenoid to open the diverter blades and bypass a portion of the hot gas. In a similar manner, a low pressure condition will be remedied by the blades closing the bypass duct and forcing the hot gas to pass over the fin tubes to increase the heat transfer and, therefore, pressure. Under stable conditions, a point is reached where no electric signal is fed to the diverter actuator, and the pressure remains constant.

Figure 3:
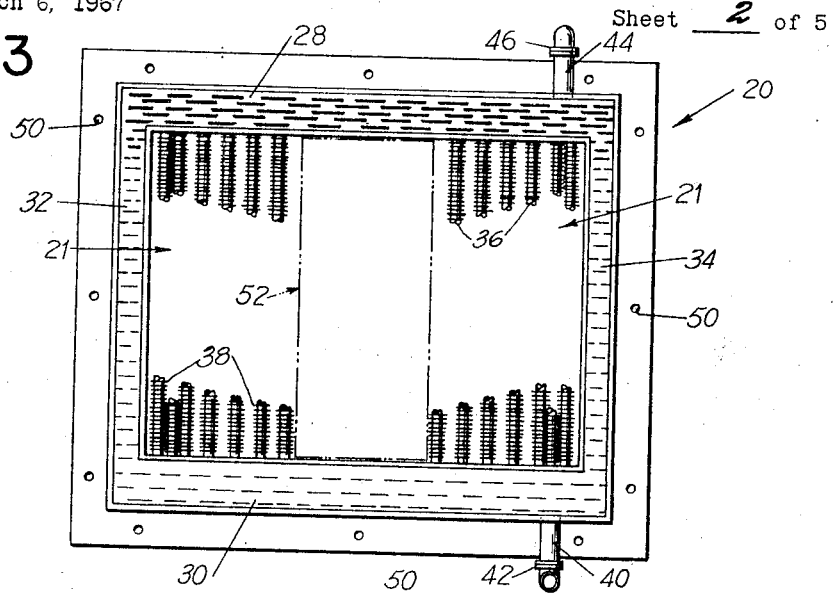
FIG. 3 is a sectional view of another embodiment of the structure of the invention.

Continuing with FIG. 5, the bypass or secondary duct consists of a solid sheet member positioned along the top, bottom and sides to form a duct 82 having a cross sectional configuration which can be square, rectangular or otherwise. Positioned within the duct 82 but displaced from the walls thereof is a perforated sheet member 84 which forms another duct 86. The intervening space defined by the larger duct 82 and the smaller duct 86 is filled with acoustical packing which serves the ancillary function of thermal insulation. Thus, hot gas flowing through duct 86 is not only physically and thermally isolated from the tubes 36, but the turbine exhaust is partially silenced. When a secondary duct is used to dump undesired heated gas, the heat transfer units must be modified to accept the secondary duct. Referring to FIG. 3, an area for the bypass or secondary duct is formed by extending the width of the heat transfer unit 20 to provide a gap 52 which can be centrally positioned from the side walls. The gap 52 is sized to accommodate the duct 72 and, when assembled, the heat transfer units 20 are positioned on the duct 82 such that duct 82 extends through the gap 52 of the heat transfer units 20.

Figure 6:
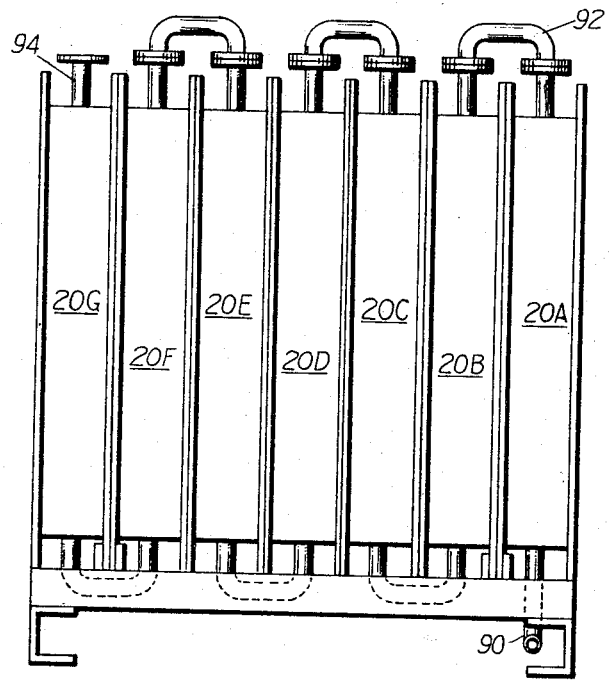
FIG. 6 is a side view of the structure of the invention arranged for operation as a hot water heater.
Figure 10:
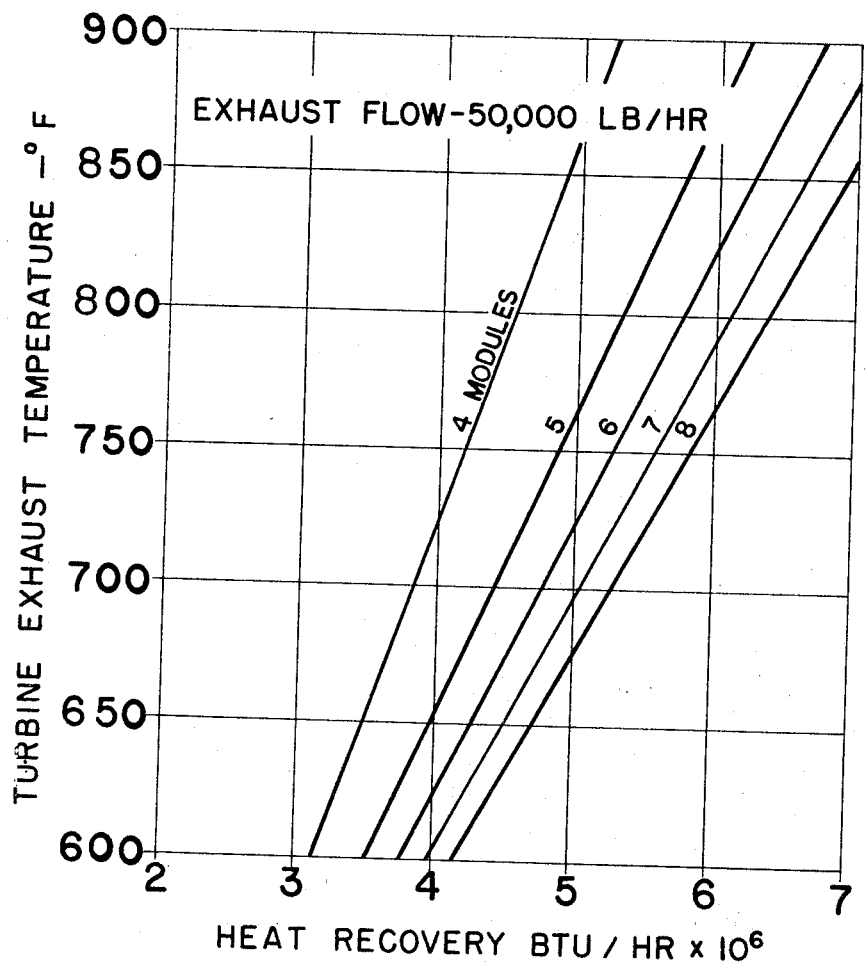
FIG. 10 is a plot of turbine exhaust temperature vs. heat recovery for various numbers of heat transfer units.

In the assembly of a final unit, a predetermined number of heat transfer units 20 are positioned together, one behind the other, the number of units being determined by the size of the turbine engine. FIG. 10 illustrates how the recovery of heat varies as the number of heat transfer units 20 are increased from four to eight for a specific turbine. As would be expected, the percentage increase in recovery decreases with each section added because of the reduction in final temperature difference. The actual connections between the various heat transfer units is dependent upon the specific application for which the boiler is designed. FIG. 6 illustrates the connection between the heat transfer units when a hot water heater type of unit is desired. Referring to FIG. 6, the fluid to be heated is fed through pipe 90 to the supply header of unit 20A. Fluid from the exhaust header of unit 20A is fed to the supply header of unit 20B through pipe 92. Fluid from exhaust header of unit 20B is fed to the supply header of unit 20C through a pipe positioned underneath the assemblage. The fluid flows through each of the units 20D, 20E, 20F, and 20G in a like manner, emerging in its final heated condition from pipe 94.

Figure 7:
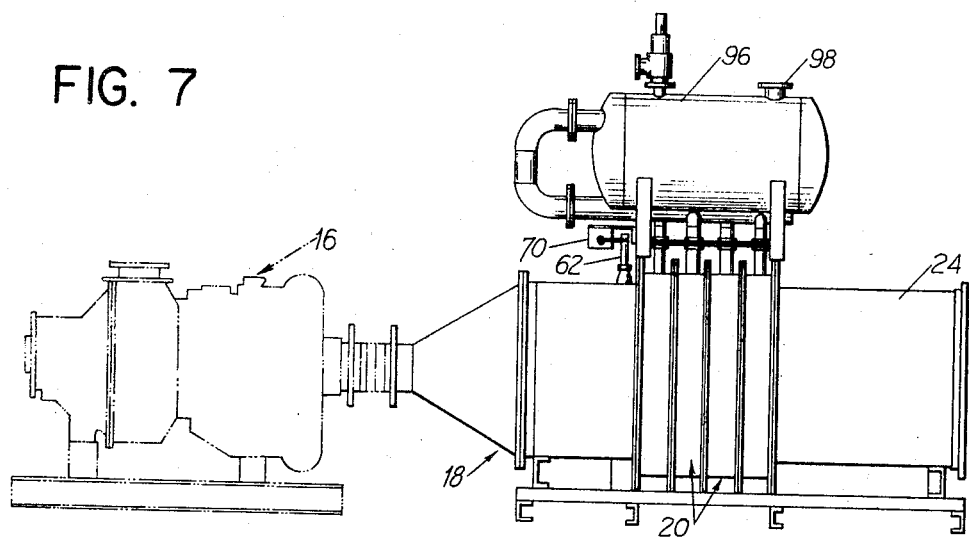
FIG. 7 is a side view of the structure of the invention together with a steam drum to operate as a steam generator.

The assemblage illustrated in FIG. 1 is for a hot water heater. By adding a steam drum 96 as illustrated in FIG. 7, the assemblage can be connected to produce steam, the steam appearing at outlet 98.

Figure 8:
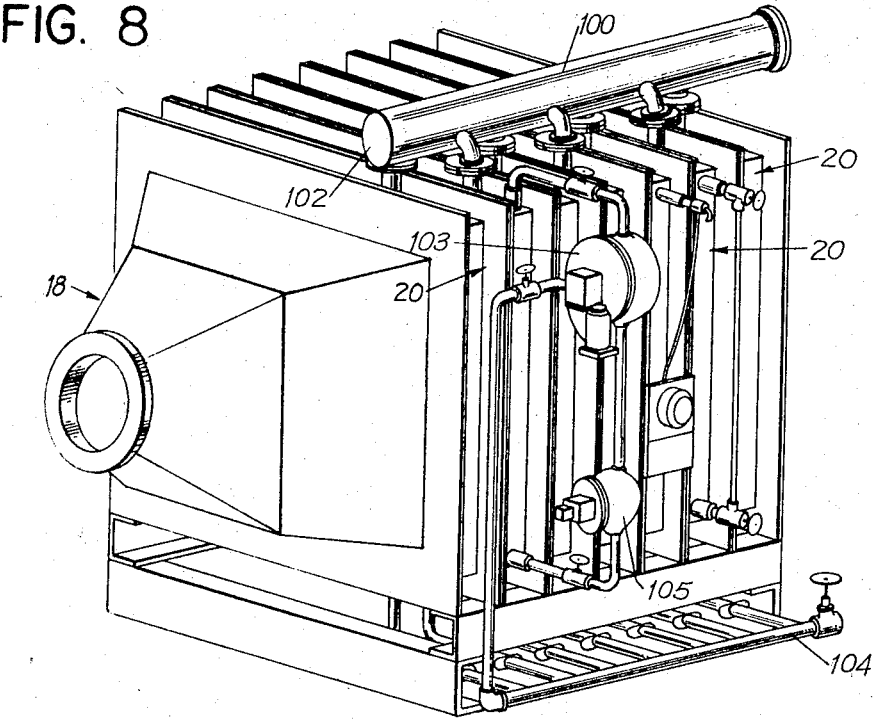
FIG. 8 is a view of the structure of the invention arranged for operation as a once-through boiler.

Additionally, the structure of this invention can be assembled as a once through boiler as illustrated in FIG. 8. To obtain this arrangement, the upper water space must be extended to provide sufficient volume for proper steam separation. The extended upper space can be obtained by a pipe 100 closed at one end 102 and connected to the upper header of each unit 20. Water is then admitted to the heat exchange units through pipe 104 at the same rate at which it is evaporated. This arrangement eliminates the need for an external steam drum which, in turn, would result in a considerable space savings. The water admitted to the boiler must, however, be of extreme purity to prevent rapid scaling of the tubes. Units 103 and 105 control the water level in the units 20.

Figure 9:
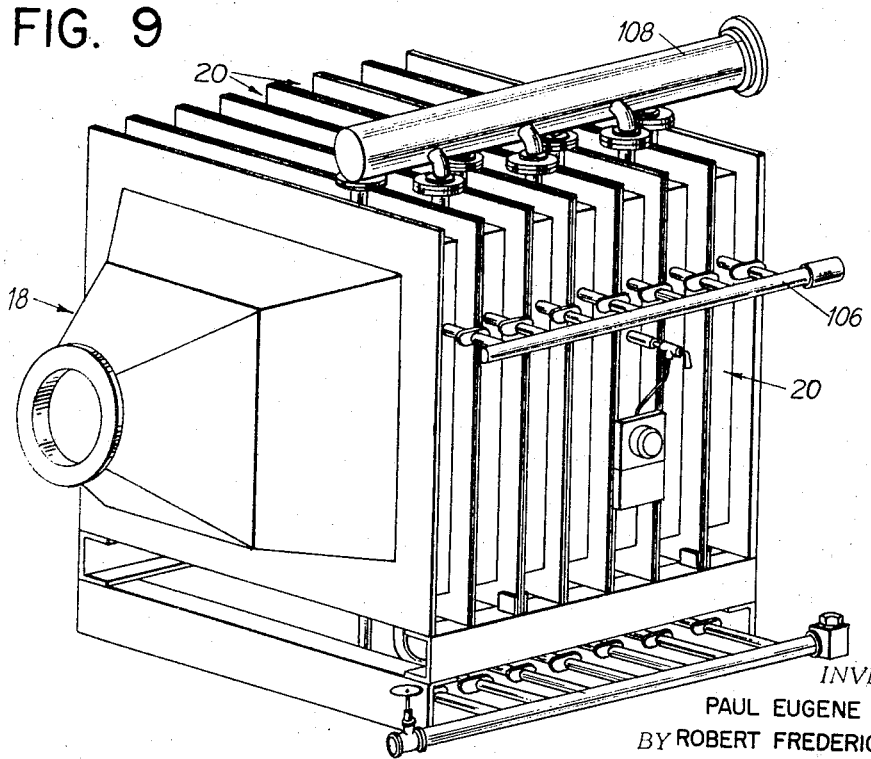
FIG. 9 is a view of the structure of the invention arranged for operation as a flash boiler.

Continuing, the structure of this invention can also be assembled as illustrated in FIG. 9 to eliminate completely contained water in the heat exchange units. In this arrangement, steam is formed by pumping water at a high pressure through pipe 106 to create a spray of water onto the inner surface of the tubes. The water will flash into steam and be removed as it is formed from the pipe 108. Any condensate formed is collected at the bottom of each unit 20 and discharged through a trap. This assemblage is very light in weight and is immune to upsets caused by rolling, pitching or joining of the heat exchange units. The water used in this design would also have to be of extreme purity.

From the foregoing it becomes apparent that the modular design adapts itself to the mass production of identical sections which can be assembled into a variety of types of boilers. Additionally, an assembled boiler is adaptable to either internal or external bypass ducts with or without integral diverter value and/or silencer. Continuing, an assembled boiler can easily be adapted for either hot water service or steam production. As a hot water heater the units can be arranged for either series or parallel flow. For steam production, an assembled boiler can be assembled to operate as a recirculating with external steam drum assemblage; or as a once through with internal separation assemblage; or as a flash type assemblage.

Obviously, many modifications and variations of the present invention are possible in the light of the above teachings. It is, therefore, to be understood that within the scope of the appended claims the invention may be practiced otherwise than as specifically described.

What is claimed is:

1. In combination with a turbine, a heat exchanger through which hot gas from a turbine is passed in heat exchange relationship with water comprising a supply header to define a section of an annular duct for said water, a discharge header to define another section of the annular duct, water conducting means interposed between said supply header and said discharge header to complete said annular duct, a primary duct defined by the inner walls of said annular duct, a plurality of heat exchange tubes interposed between said supply header and said discharge header transversing said primary duct, water feed means coupled to feed water to be heated to said supply header, and water discharge means coupled to receive water which has been heated from said discharge header.

2. The structure of claim 1 wherein said supply header, said discharge header and said water conducting means are of substantially the same depth.

3. The structure of claim 1 including a secondary duct within said primary duct for hot gas to bypass the plurality of heat exchange tubes.

4. The structure of claim 3 including means to selectively direct said hot gas through said secondary duct to bypass said plurality of heat exchange tubes.

5. In a boiler, a heat exchanger through which hot gas is passed in heat exchange relationship with a fluid comprising a supply header to define a section of an annular duct for said fluid, a discharge header to define another duct for said fluid, fluid conduction means interposed between said supply header and said discharge header to complete said annular duct, a primary duct defined by the inner walls of said annular duct, a secondary duct within said primary duct, a plurality of heat exchange tubes interposed between said supply header and said discharge header transversing said primary duct, a first diverter valve coupled to selectively direct a portion of said hot gas through said secondary duct to bypass said plurality of heat exchange tubes in said primary duct, a second diverter valve to selectively direct another portion of said hot gas through said secondary duct to bypass said plurality of heat exchange tubes in said primary duct, and means to activate sequentially said first and second diverter valves.

6. The structure of claim 5 wherein said means comprises a solenoid valve driven by a pressure sensitive element.

7. The structure of claim 5 wherein said means comprises a solenoid valve driven by a pressure sensitive element and coupled to drive directly said first diverter valves and means coupled to condition said second diverter valve to follow said first diverter valve.

8. The structure of claim 7 wherein said means comprises a spring.

9. In combination with a turbine, a heat exchanger through which hot gas from a turbine is passed in heat exchange relationship with water comprising a primary duct for hot gas, a secondary duct cooperating with said primary duct, at laest one heat exchange tube transversing said primary duct for said water, and a diverter valve coupled to selectively direct hot gas through said secondary duct to bypass said heat exchange tube in said primary duct.

References Cited

UNITED STATES PATENTS

| | | | |
|---|---|---|---|
| 2,189,749 | 2/1940 | Windheim et al. | 165—35 XR |
| 2,291,637 | 8/1942 | Kohlmann | 165—35 |
| 2,449,696 | 9/1948 | Geddes et al. | 165—37 |
| 2,809,810 | 10/1957 | Carroll et al. | 165—37 |
| 3,208,510 | 9/1965 | Ohnoda et al. | 165—51 |

FRED C. MATTERN, JR., *Primary Examiner.*

MANUEL ANTONAKAS, *Assistant Examiner.*

U.S. Cl. X.R.

165—51